United States Patent [19]

Rosenmann et al.

[11] Patent Number: 5,542,384
[45] Date of Patent: Aug. 6, 1996

[54] HYDRAULIC ENGINE STARTING EQUIPMENT

[75] Inventors: Jack P. Rosenmann, Strathavon; Alfred Buschberger, Midrand, both of South Africa

[73] Assignee: Fluid Precision (Proprietary) Limited, Rivonia, South Africa

[21] Appl. No.: 217,628

[22] Filed: Mar. 24, 1994

[30] Foreign Application Priority Data

Mar. 26, 1993 [ZA] South Africa .......................... 93/2141

[51] Int. Cl.$^6$ .................................................. F02N 17/00
[52] U.S. Cl. ........................................ 123/179.31; 251/43
[58] Field of Search ........................ 123/179.31; 251/43; 60/625, 626, 677

[56] References Cited

U.S. PATENT DOCUMENTS

| | | | |
|---|---|---|---|
| 711,349 | 10/1902 | Schlaepfer | 251/43 |
| 1,646,640 | 10/1927 | Daniel | 251/43 |
| 1,876,223 | 9/1932 | Hagey | 251/43 |
| 2,619,777 | 12/1952 | La Point | 251/43 |
| 2,723,101 | 11/1955 | Achberger | 251/43 |
| 2,815,921 | 12/1957 | Bigelow | 251/43 |
| 3,075,556 | 1/1963 | Hutter et al. | 251/43 |
| 3,076,630 | 2/1963 | Hammond | 251/43 |
| 3,171,432 | 3/1965 | Bard | 251/43 |
| 3,675,417 | 7/1972 | Shum | 60/626 |
| 3,780,763 | 12/1973 | Wisniewski | 251/43 |
| 3,807,686 | 4/1974 | Furusawa | 251/43 |
| 3,816,040 | 6/1974 | Janik | 123/179.31 |
| 3,820,444 | 6/1974 | Ward | 251/43 |
| 4,494,499 | 1/1985 | Stein | 60/627 |
| 4,694,791 | 9/1987 | Tanaka | 123/179.31 |
| 4,915,126 | 4/1990 | Gyllinder | 137/495 |

*Primary Examiner*—Thomas N. Moulis
*Attorney, Agent, or Firm*—McAulay Fisher Nissen Goldberg & Kiel, LLP

[57] ABSTRACT

Hydraulic equipment used for starting engines utilizing a source of hydraulic fluid under pressure. The fluid under pressure is supplied to an engine starter motor through a valve assembly without causing shock loads, wherein the valve assembly comprises a soft start valve including a tapered poppet valve and a pilot valve for controlling movement of the poppet valve.

20 Claims, 1 Drawing Sheet

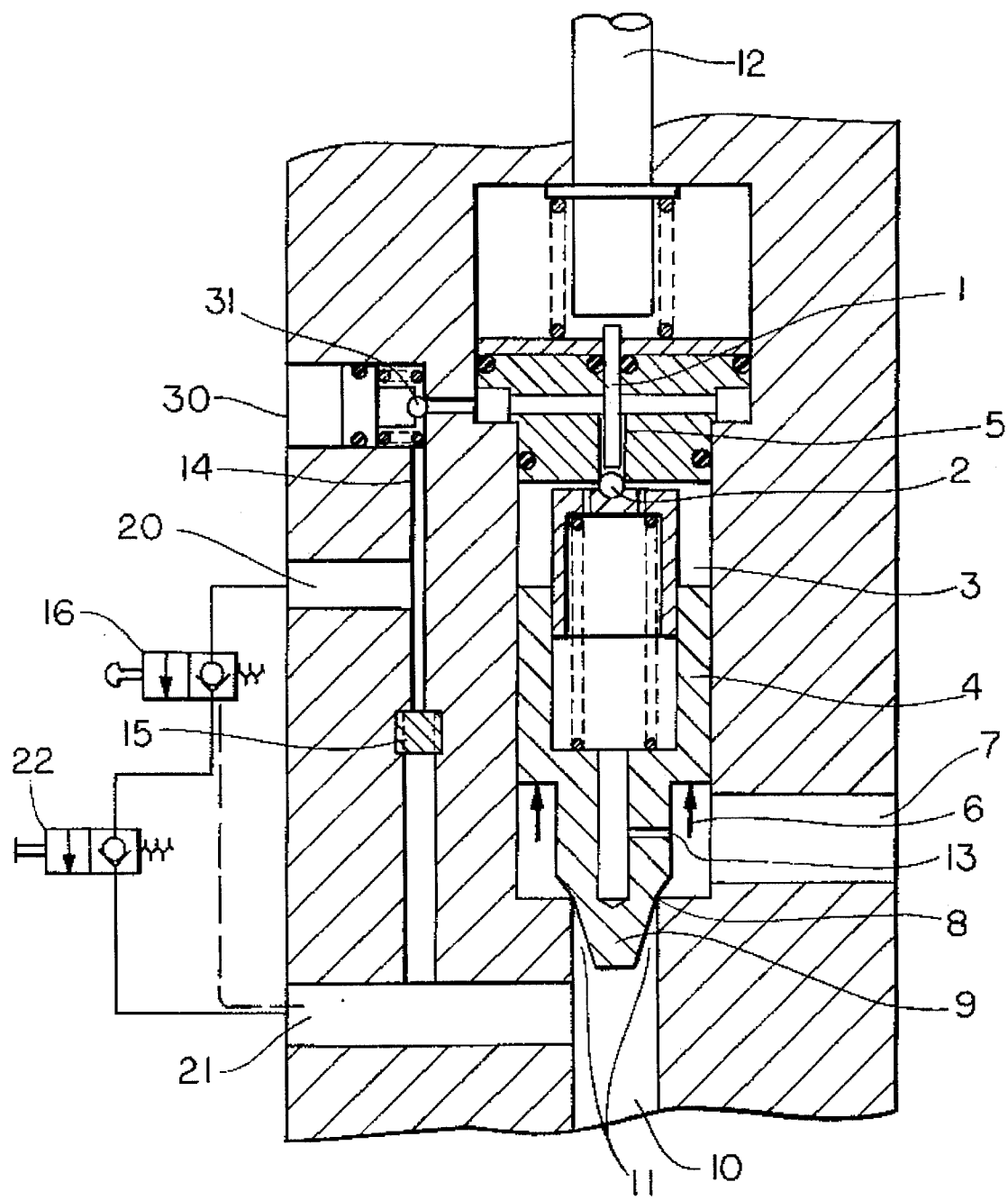

5,542,384

HYDRAULIC ENGINE STARTING EQUIPMENT

INTRODUCTION

This invention relates to equipment used for the starting of engines utilising a source of hydraulic fluid under pressure.

BACKGROUND TO THE INVENTION

A hydraulic self starting system has to release the stored energy in an accumulator or other source under high pressure via a start valve to the starter motor which subsequently turns the engine to achieve self ignition at the engine. To restore the energy the accumulator, if an accumulator is used, is recharged by an engine driven pump through an automatic recharge valve. If for whatever reason the stored energy is exhausted before the engine has fired, the energy can be restored by means of a manual hand pump, which is not possible in the commonly used electrical starting system. This is one of the great advantages of the hydraulic starting systems.

In these systems the more commonly known starter motor valves impose high shockloads during the initial part of the engine cranking cycle. This is the result of extremely rapid acceleration of the starter motor, which once it has engaged with the engine flywheel ring gear, is momentarily brought to a halt until the inertia of the engine is overcome and the engine and starter motor rotate together. These shock loads can result in premature failure of starter pinion gear and engine ring gear.

OBJECT OF THE INVENTION

It is the object of this invention to provide a mechanism which will enable hydraulic starting of an engine to be effected without causing the shock loads above referred to. This is known as a "soft start" system.

SUMMARY OF THE INVENTION

According to this invention there is provided hydraulic equipment for starting an engine comprising a source of hydraulic fluid under pressure connected to an engine starter motor through a valve assembly characterised in that the valve assembly comprises a soft start valve in the form of a tapered poppet valve with a pilot valve arranged to control movement of the poppet valve.

Further features of this invention provide for the stem of the poppet valve to be in the form of a piston and cylinder assembly in a housing, housing a pilot valve controlled outlet and an outlet controlled by the poppet valve and an inlet; the cylinder component of the poppet valve in sealing engagement with the wall of the housing and a communication passage from the housing inlet through the cylinder and piston into the housing.

The invention also provides for the pilot valve to be controlled through an independent actuator and for the pilot valve to be integral with or remote from the poppet valve and casing assembly.

Still further features of this invention provide for there to be a series of valves in the drain passage from the pilot valve, each valve adapted to be held closed by pressure mechanical or electrical signals received from different items in the engine transmission or any other device on the machine.

BRIEF DESCRIPTION OF THE DRAWING

The invention will be described in examples illustrated in the accompanying partially diagrammatic drawing which shows a cross-section through the soft start valve assembly.

DETAILED DESCRIPTION OF THE DRAWING

As illustrated the soft start valve assembly has an actuator plunger (1) located to control a pilot valve (2). This valve (2) can conveniently be arranged in an outlet from a chamber (3). The chamber (3) is formed as a housing for a poppet valve (4) which itself is in the form of a piston and cylinder assembly described in more detail below. The cylinder of this assembly can slide in sealing engagement with the wall of the housing and a compression spring is included to bias the piston from the cylinder into an extended position.

An actuator stem to move the pilot valve (2) off its seat is located in an accurately machined passage (5) so that flow through the passage passed the stem is restricted and controlled to predetermined limits. These limits can readily be determined by those skilled in hydraulic controls.

The piston of the piston and cylinder arrangement which forms the poppet valve (4) is hollow and flow may take place from the piston into the chamber (3). Fluid pressure indicated at (6) acts on the annular shoulder of the poppet valve (4) from the inlet (7) which in use is connected to the supply of hydraulic fluid under pressure from an accumulator or hydraulic power pack or the like.

The poppet valve seating face (8) has a tapered stem (9) so that flow through the outlet (10) from the inlet (7) can only take place through the annular opening (11) around the tapered stem (9) when the poppet valve cylinder moves away from the seat. This movement in the housing results from the fluid pressure from the hydraulic source acting on the shoulder (6) after the actuator stem has been acted on by plunger (I) to open the outlet from the chamber (3) through the control valve (2).

The actuator stem indicator at (12) is preferably spring loaded to an ineffective position and may be operated manually, or through electrical or hydraulic controls in known manners to retract the piston and cylinder components of the poppet valve (4) an open valve (2).

A passage (13) is provided to permit communication from inside the cylinder component of poppet valve (4) to the inlet (7), this is a restricted passage (13). Communication openings (13a) enclosed between the inside of the piston component of the poppet valve (4) and the chamber (3). The restricted passages and communication openings above described are sized so that the poppet valve (4) can open when the actuator (1) is operated. On release of the actuator fluid will flow into the chamber (3) and the piston and cylinder components will extend again both under spring loading and fluid pressure derived from flow through passage (13). This will result in closure of control valve and enable the poppet valve to close. The soft start valve is thus rendered inoperative as is necessary once the engine has been started and is running.

A drain passage (14) extends from the pilot valve (2) back into the outlet (10) from the poppet valve (4) or directly back to the reservoir for hydraulic fluid for the high pressure supply. In this passage (14) can be located a further valve shown at (31) in a passage (30) which is connected into the pressure side of the engine oil circulation so that with the engine running the engine oil pressure will act to close valve (31). This will render the soft start valve assembly inoperative whether or not the actuator is operated to open pilot valve (2).

The operation of the soft start valve assembly thus occurs through the pilot valve (2) being opened to allow a gradually increasing flow of hydraulic fluid through the poppet valve (4) from the pressure source of hydraulic fluid to an engine starter motor. This flow ceases when the pilot valve (2) or the safety valve (31) closes the drain from the valve whether this drain is to the outlet (10) from the valve (4) or directly back to the hydraulic fluid reservoir.

It will be appreciated that the construction above described has the pilot valve as an integral part of the soft start valve assembly. In alternative constructions the pilot valve can be separate from the main poppet valve arrangement and such alternatives are indicated diagrammatically in the drawing.

In the first alternative a plug (15) is fitted in the draining passage (14) and the pilot valve (2) is dispensed with along with the actuator arrangement. The drainage passage (14) now extends through port (20) and an external drain control valve (16) back through port (21) into the outlet from the poppet valve (4) or back to the hydraulic fluid reservoir. This valve will be used as the pilot valve above described to allow operation of the soft start valve as required.

Also it will be understood that the valves (2) or (16) can be used with further drain control valves, one of which is indicated at (22) in the drainage passage (14). These valves (16) and (22) will be connected in series and will be maintained closed by pressure generated through messages received from engine, transmission or safety device components of the engine. These valves (22) will provide safety features preventing inadvertent operation of the soft engage valve assembly. The signals may come from the engine cooling water or lubrication systems or from the fuel pump or the engine manifold pressure or other components which operate when the engine has started and is running. Alternatively the signals may derive from the position of the gear or brake lever or a driver's seat height indicator. In any event it will be understood that the system above described is versatile and the pilot valve can be located on a starter panel while the poppet valve assembly can be mounted remote from the panel.

The system above described can provide a range of capabilities which can be chosen to meet particular requirements. Some examples then are as follows:

(i) Simple soft start feature in a positive sealed hydraulic valve;

(ii) A soft start feature with external valve control of the drain passage from the poppet valve;

(iii) The pilot valve being either integral with or separate and remote from the main valve of the soft start valve assembly;

(iv) A series of drain passage control valves to provide additional safety features; and Alternative means for actuating the pilot valve, which can be hydraulic, manual or electrical means.

It will be appreciated that various combinations of these features can readily be obtained.

What is claimed is:

1. Hydraulic equipment for starting an engine comprising a source of hydraulic fluid under pressure connected to an engine starter motor through a valve assembly, wherein said valve assembly comprises:

a soft start valve, including a poppet valve having a tapered stem extending through the opening and a pilot valve for controlling movement of said poppet valve to permit a gradual increase of flow through said poppet valve as it opens and a pilot valve for controlling the movement of said poppet valve.

2. Hydraulic equipment as claimed in claim 1, wherein:

said poppet valve is a piston and cylinder assembly housed in a housing, housing a pilot valve controlled outlet and an outlet controlled by the poppet valve and an inlet; and said poppet valve has a cylinder component in sealing engagement with a wall of said housing and a communication passage from the housing inlet through the cylinder and piston with the housing.

3. Hydraulic equipment as claimed in claim 2, wherein the piston and cylinder assembly is spring loaded to bias the piston from the cylinder into an extended position.

4. Hydraulic equipment as claimed in claim 1, including an independently operable actuator for controlling said pilot valve.

5. Hydraulic equipment as claimed in claim 2, including an independently operable actuator for controlling said pilot valve.

6. Hydraulic equipment as claimed in claim 5, wherein said pilot valve is integral with said poppet valve and said housing.

7. Hydraulic equipment as claimed in claim 2, including a drainage passage from said housing, said pilot valve being remote from said poppet valve in said drainage passage.

8. Hydraulic equipment as claimed in claim 5, including a drainage passage from said housing, said pilot valve being remote from said poppet valve in said drainage passage.

9. Hydraulic equipment as claimed in claim 1, including a housing for said poppet valve and a drainage passage from said housing and an additional control valve located in said drain passage operable to open in response through pressure generated from messages provided by a specific engine function.

10. Hydraulic equipment as claimed in claim 9, including a plurality of additional control valves located in series in said drainage passage.

11. Hydraulic equipment as claimed in claim 2, wherein said pilot valve is integral with said poppet valve and said housing.

12. Hydraulic equipment as claimed in claim 8, wherein said pilot valve is located remote from said poppet valve in said drainage passage from said housing.

13. Hydraulic equipment as claimed in claim 12, including a plurality of additional control valves located in series in said drainage passage.

14. Hydraulic equipment as claimed in claim 2, including orthogonal flow passages between said inlet and said poppet valve controlled outlet.

15. Hydraulic equipment as claimed in claim 1, wherein said hydraulic fluid is a non-compressible liquid.

16. Hydraulic equipment as claimed in claim 1, wherein said hydraulic fluid is constantly under pressure.

17. Hydraulic equipment for starting an engine comprising a source of hydraulic fluid under pressure connected to an engine starter motor through a valve assembly;

said valve assembly comprising a soft start valve, including a tapered poppet valve and a pilot valve for controlling movement of said poppet valve to permit a gradual increase of flow through said poppet valve;

said poppet valve being a piston and cylinder assembly housed in a housing, housing a pilot valve controlled outlet and an outlet controlled by the poppet valve and an inlet;

said poppet valve having a cylinder component in sealing engagement with a wall of said housing and a communication passage from the housing inlet through the cylinder and piston with the housing; and a drainage passage from said housing and an additional control valve located in said drain passage operable to open in response through pressure generated from messages provided by a specific engine function.

18. Hydraulic equipment for starting an engine comprising a source of hydraulic fluid under pressure connected to an engine starter motor through a valve assembly, wherein said valve assembly comprises:

a soft start valve, including a tapered poppet valve and a pilot valve for controlling movement of said poppet valve to permit a gradual increase of flow through said poppet valve;

said poppet valve being a piston and cylinder assembly housed in a housing, housing a pilot valve controlled outlet and an outlet controlled by the poppet valve and an inlet;

said poppet valve having a cylinder component in sealing engagement with a wall of said housing and a communication passage from the housing inlet through the cylinder and piston with the housing;

a drainage passage from said housing, said pilot valve being remote from said poppet valve in said drainage passage; and a plurality of additional control valves located in series in said drainage passage.

19. Hydraulic equipment as claimed in claim 2, wherein said cylinder components form the poppet valve seating at the inlet to the housing and carrying said tapered stem extending axially through the inlet opening so that flow through the inlet may increase gradually as the valve opens.

20. Hydraulic equipment for starting an engine comprising a source of hydraulic fluid under pressure connected to an engine starter motor through a valve assembly, wherein said valve assembly comprises:

a soft start valve, including a tapered popped valve and a pilot valve for controlling movement of said poppet valve to permit a gradual increase of flow through said poppet valve;

a housing for housing a pilot valve controlled outlet;

a drainage passage from said housing; and an additional control valve located in said drainage passage.

* * * * *